Feb. 28, 1956 J. C. ESHER 2,736,270
LOCOMOTIVE FRAME
Filed June 24, 1950 6 Sheets-Sheet 1
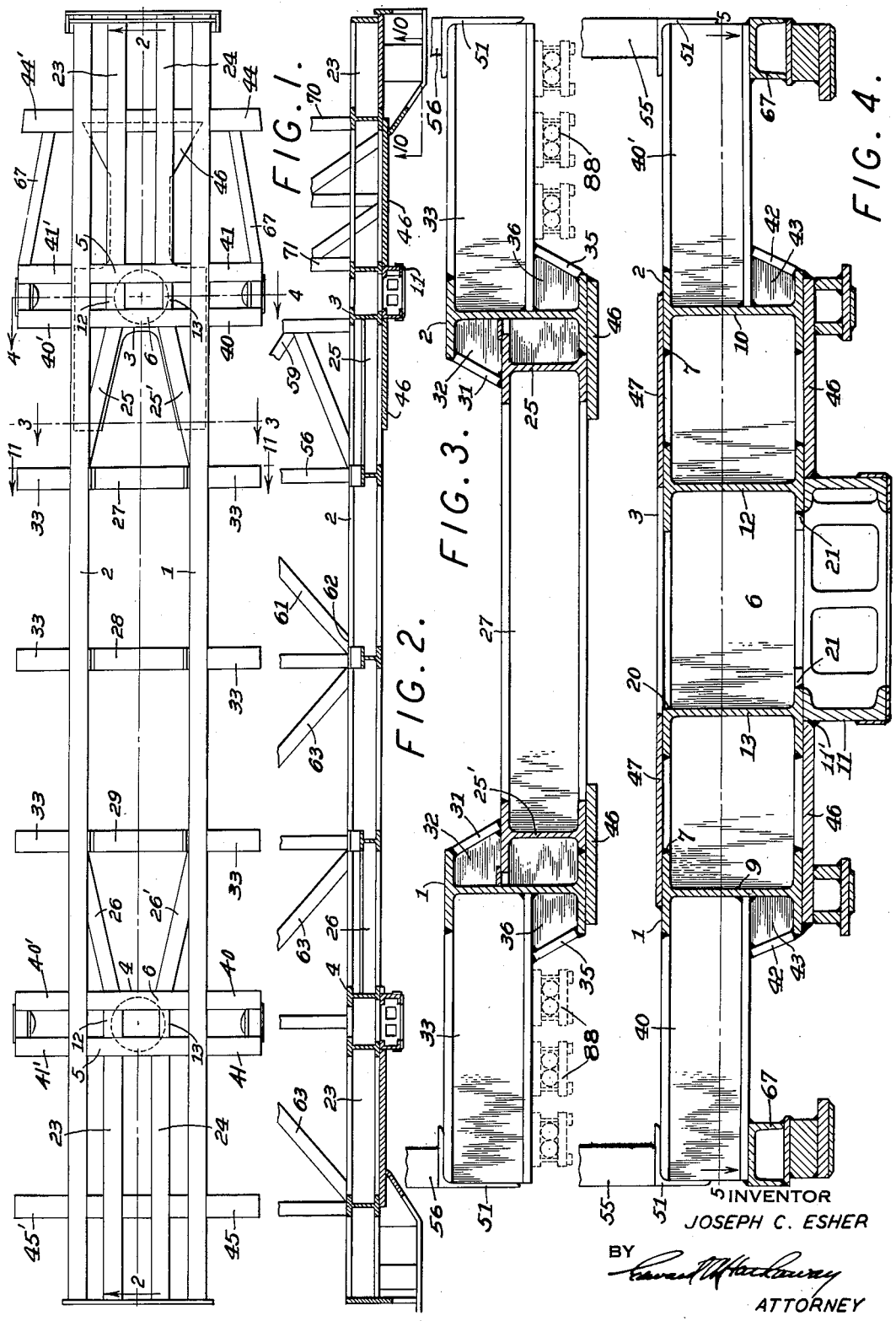
INVENTOR
JOSEPH C. ESHER
BY
ATTORNEY

INVENTOR
JOSEPH C. ESHER
BY
ATTORNEY

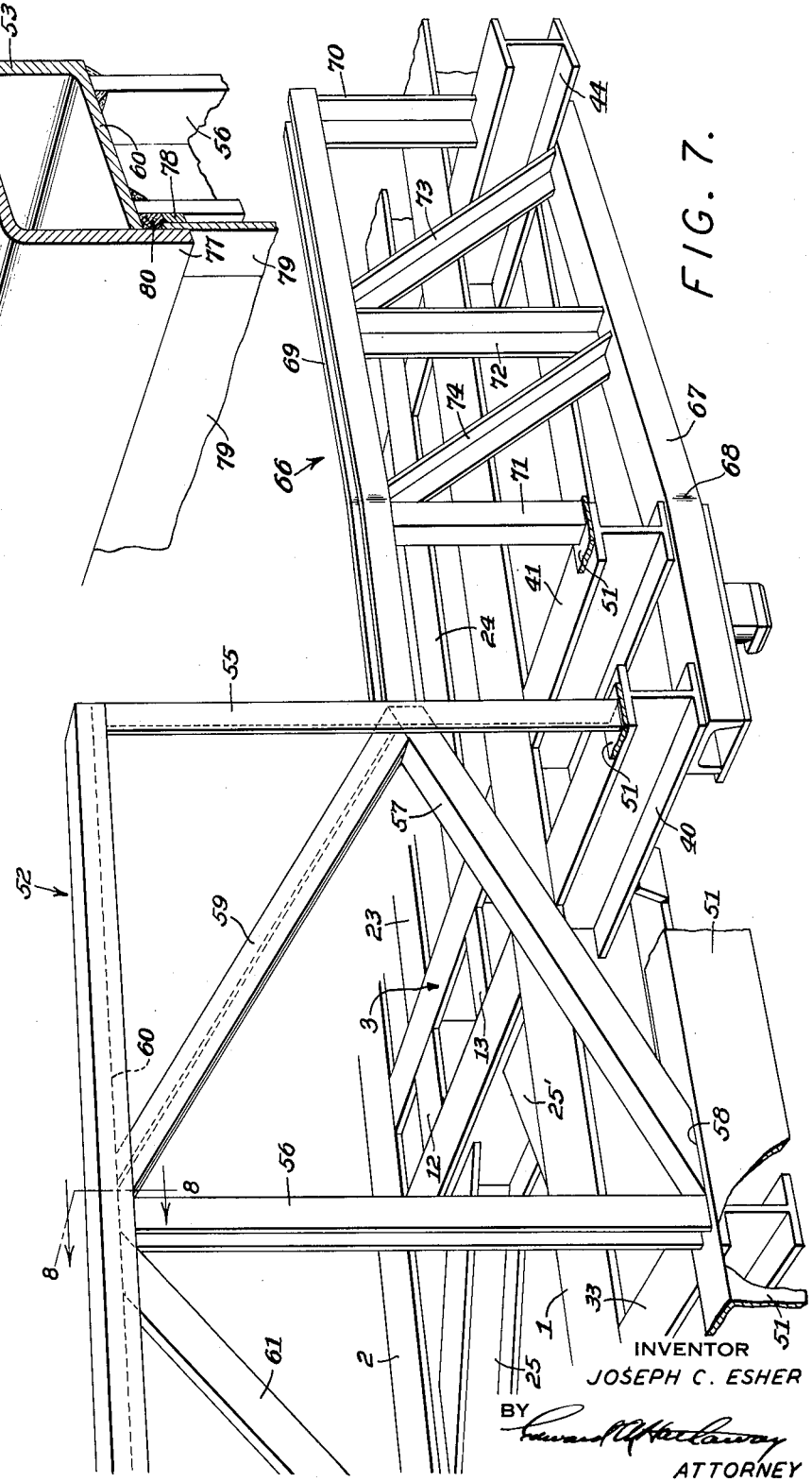

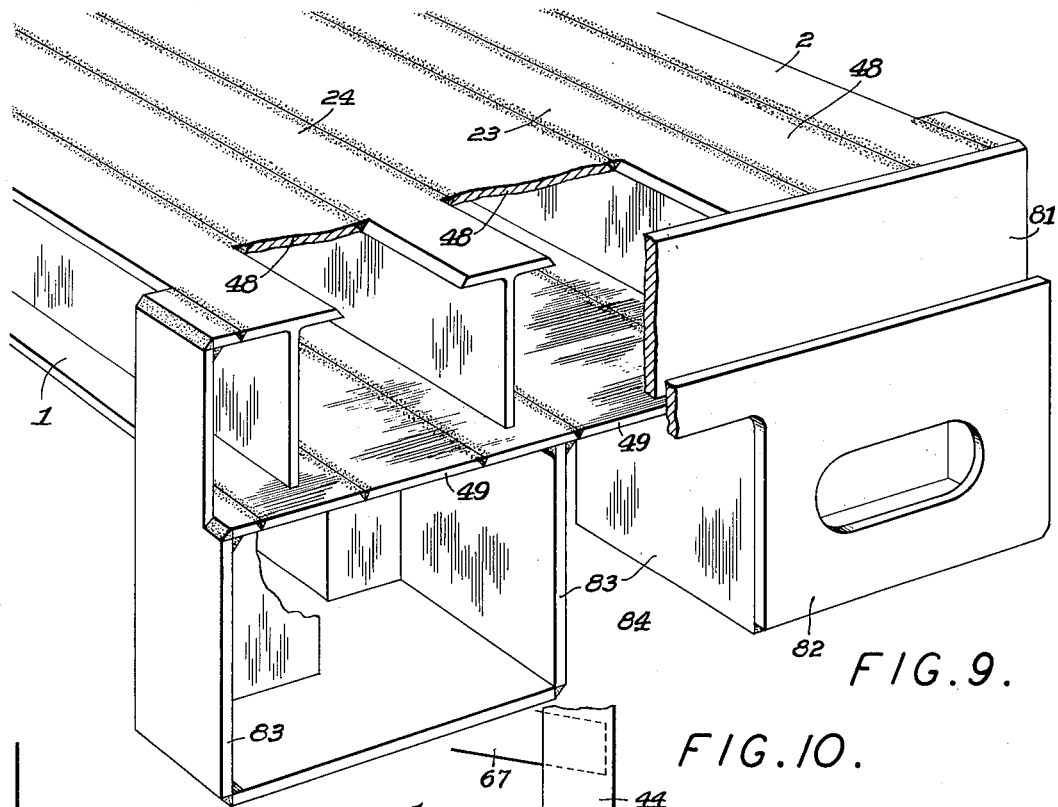
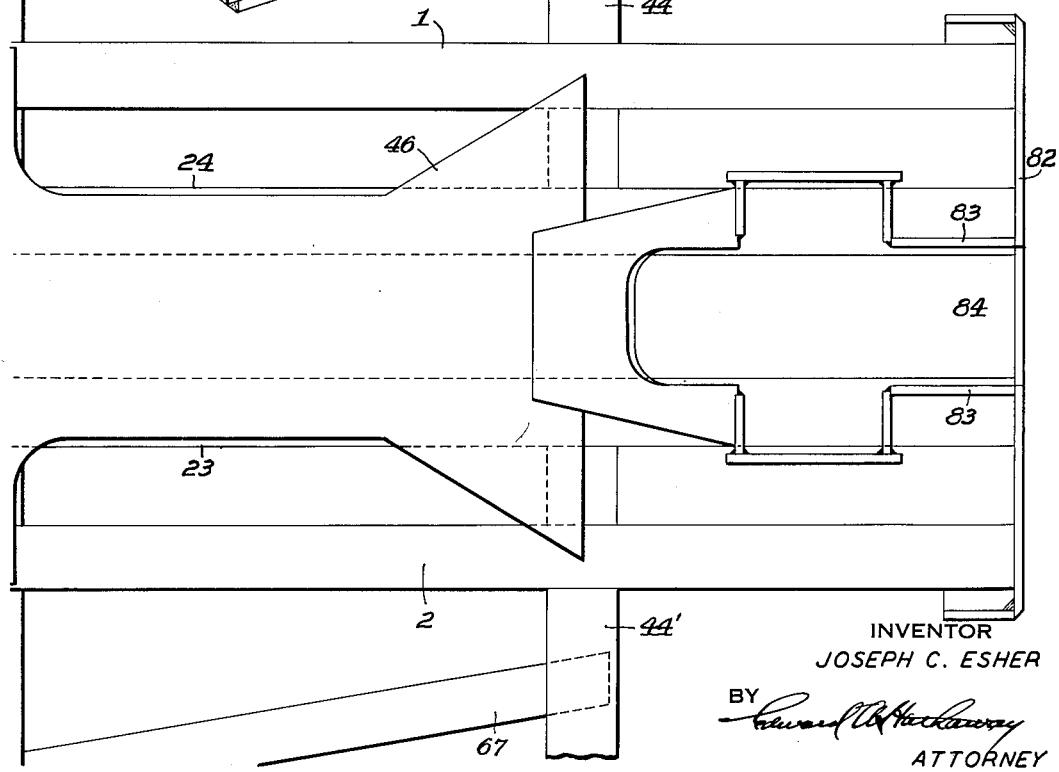

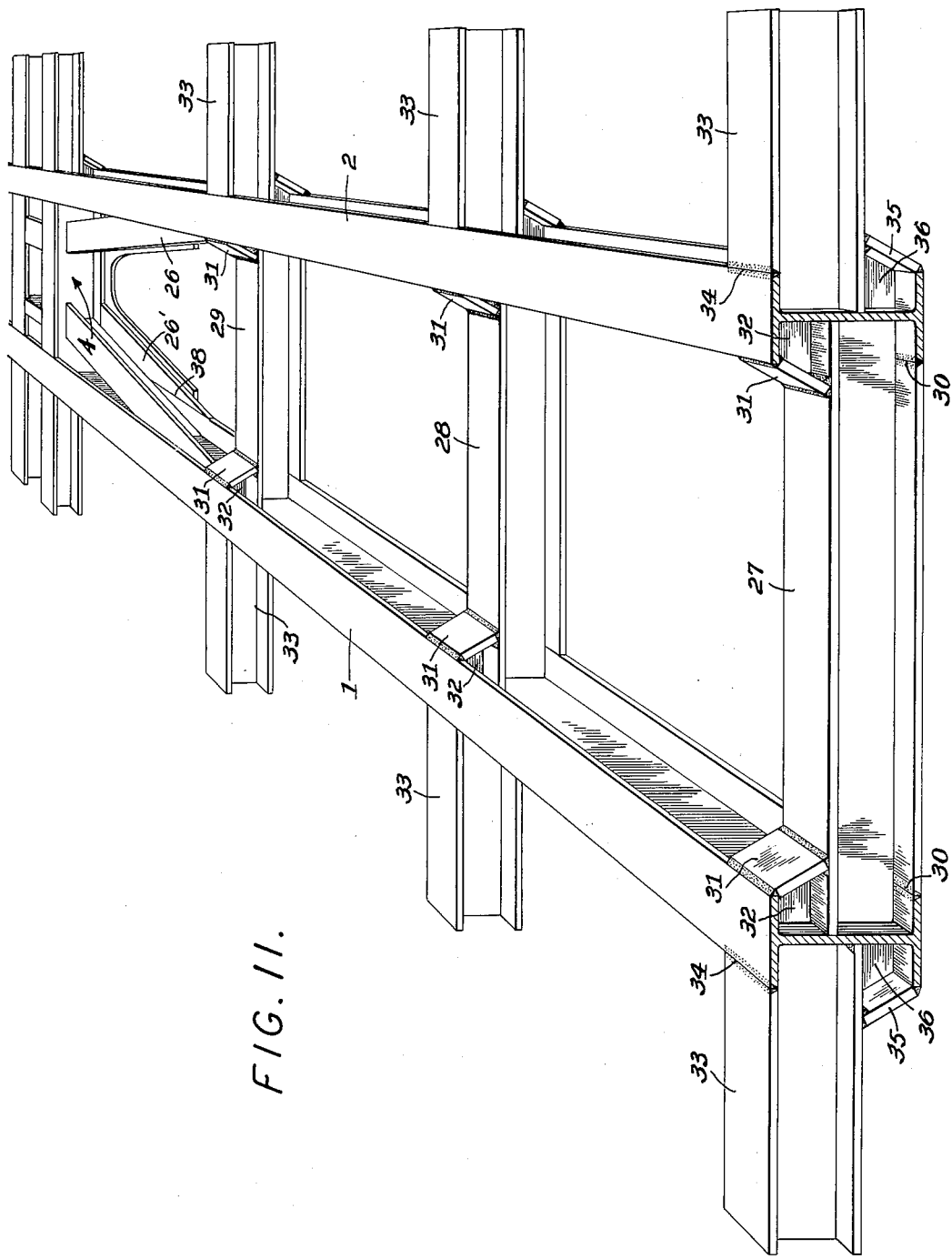

Feb. 28, 1956     J. C. ESHER     2,736,270
LOCOMOTIVE FRAME
Filed June 24, 1950     6 Sheets-Sheet 6

FIG. 12.

INVENTOR
JOSEPH C. ESHER
BY
ATTORNEY

United States Patent Office 2,736,270
Patented Feb. 28, 1956

2,736,270

LOCOMOTIVE FRAME

Joseph C. Esher, Thornton, Pa., assignor to Baldwin-Lima-Hamilton Corporation, a corporation of Pennsylvania Application June 24, 1950, Serial No. 170,133

18 Claims. (Cl. 105—172)

This invention relates generally to built-up welded type underframes for locomotives, particularly diesel engine locomotives, and it is an object of my invention to provide an improved welded type underframe made from a minimum number of types of structural steel shapes which are so arranged and interrelated as to provide a lightweight rugged frame that is economical in construction, operation and maintenance and whose simplicity lends itself to very effective welding.

A further object is to provide an improved wide type underframe so functionally combined with a truss type superstructure as to obtain a high degree of rigidity with minimum weight particularly for those portions of the frame overhanging the center pins.

A further object is to provide an improved truss structure that not only fully utilizes the structural elements of the truss for strength carrying purposes, but also permits the plate sheets for the cab sides to be supported in an effective and economical manner.

While many types of built-up and cast underframes have been heretofore proposed and used, yet the same have been deficient in many structural, functional, and economical aspects, or they have involved complications in connection with the mounting of accessories, such as the longitudinal piping and electrical cables which generally extend for the greater part of the length of the underframe, whereas in my improved arrangement such accessories can be very readily installed in a most simple manner.

Other objects and advantages will be more apparent to those skilled in the art from the following description of the accompanying drawings in which:

Fig. 1 is a plan view of my improved underframe with certain top plates adjacent the center pins removed for purposes of clarity;

Fig. 2 is a longitudinal section taken on the lines 2—2 of Fig. 1 and additionally showing in elevation fragmentary portions of the truss structure;

Figure 5:
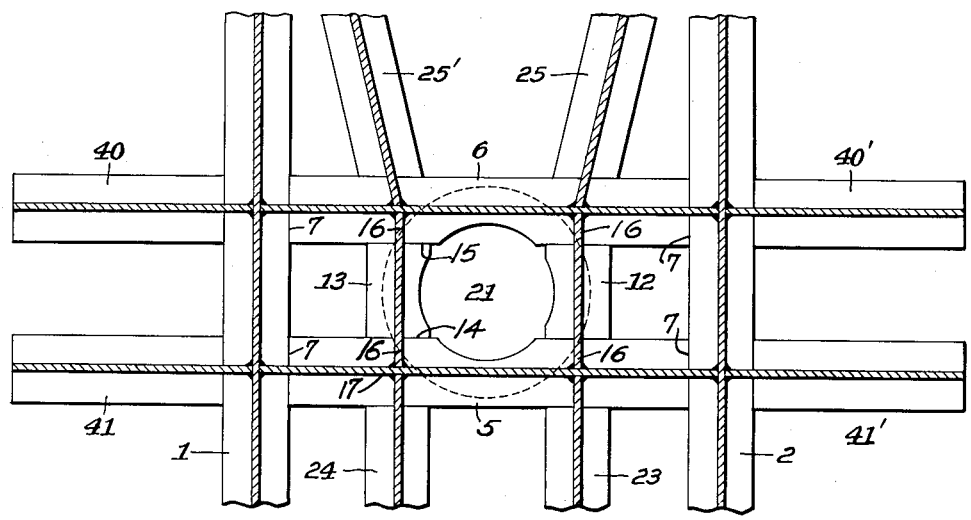
Figure 6:
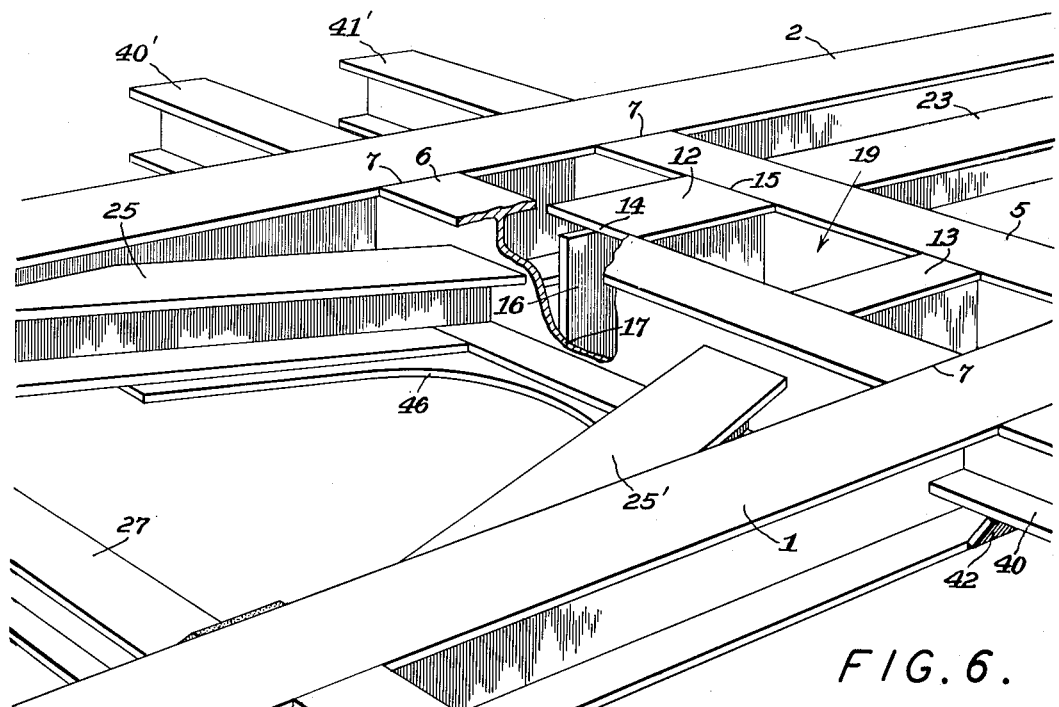

Figs. 3 and 4 are transverse sections taken respectively on the lines 3—3 and 4—4 of Fig. 1;

Fig. 5 is a sectional plan view taken substantially on the line 5—5 of Fig. 4;

Fig. 6 is an enlarged fragmentary perspective of the frame adjacent the front center pin with top plates omitted from the bolster and the front end;

Fig. 7 is an enlarged perspective of the front end of the underframe similar to Fig. 6 but showing a truss adjacent this end;

Fig. 8 is a perspective taken substantially on the line 8—8 of Fig. 7;

Fig. 9 is an enlarged fragmentary perspective of the front end of the frame showing the coupler box and with other parts cut away to show details of construction;

Fig. 10 is a bottom plan view of the front end of the frame, taken on line 10—10 of Fig. 2, showing the coupler box;

Fig. 11 is a perspective looking rearwardly from a point adjacent the line 11—11 of Fig. 1; and Fig. 12 is a perspective looking forward from the rear end of the underframe to show particularly the simplicity with which the piping can be mounted on my improved underframe and with certain plates omitted for clarity.

In the particular embodiment of the invention, as specifically disclosed herein for purposes of illustration, I obtain a wide type frame by providing a pair of relatively widely spaced longitudinal sills 1 and 2, Figs. 1 and 3, generally referred to herein as I-beams but specifically shown as H type beams. These I-beams extend for the full length of the frame and are transversely spaced apart generally about 50% of the total width of the frame, although this spacing may vary depending upon the size of the engine crankcase which is mounted upon the I-beams and extends down between the same. Front and rear bolsters 3 and 4 connect the I-beams and as they are identical in construction the description of one will suffice for both and similar parts will carry the same reference numbers. As shown in Fig. 4, particularly Fig. 6, the bolster comprises a pair of transverse I-beams 5 and 6 of the same size and type as longitudinal beams 1 and 2 and the flanges are cut-back so as to abut the flanges of the longitudinal beams as indicated at 7, while the webs of the transverse beams extend into the inside channels of the longitudinal beams to abut against the webs thereof to be welded thereto at their lines of juncture 9 and 10, Fig. 4. I also provide a pair of short longitudinal I-beams 12 and 13, again identical in size and type to the longitudinal beams and to transverse bolster beams. These short longitudinal beams 12 and 13 have their flanges cut back as shown at 14, Fig. 6, to abut the flanges of the transverse beams along their lines of juncture 15 thereby allowing web portions such as 16 to extend to the webs 17 of the transverse beams to be welded thereto. A centerpin structure 11, as shown in Fig. 4, extends through an opening in a plate 46 and rests directly upwardly against longitudinal beams 12 and 13 and similarly against the transverse bolster beams 5 and 6. The plate 46, as shown in Figs. 1, 2 and 4, extends beneath and rests directly upwardly against the bottom flanges of the longitudinal sills as well as the flanges of the I-beams 23, 24, 25, and 25' and the bolster I-beams 5, 6, 12 and 13. As shown in Fig. 4, the plate 46 is welded to the various I-beam flanges and to the center pin structure. Horizontal shear forces are transmitted between the center pin structure and plate 46 directly along a horizontal line passing commonly through the center pin structure and plate thereby eliminating shear stresses in the relatively small area of weld 11', Fig. 4, at the center pin. Instead of the shear stresses being taken by the small weld 11', such stresses are taken by the relatively enormous area of welded joints at the I-beam flanges. In this manner I provide a relatively simple but highly rugged bolster and center pin structure.

The space 19, Fig. 6, defined by the transverse and longitudinal bolster beams constitutes a vertical air passage through which cooling air is circulated to usual electric driving motors. To provide a suitable connection with the blower the inner top flange of I-beam 13 is removed as indicated at 20, Fig. 4, while the lower inner flanges are preferably partially cut to provide a substantially circular opening 21, Fig. 5.

Additionally, longitudinal I-beams 23 and 24, at both the front and rear ends of the frame, also transmit load from either the front or rear couplers to the bolsters and thence through front diagonal I-beams 25 and 25' and rear diagonal I-beams 26 and 26' to the longitudinal beams 1 and 2. As is particularly shown in Fig. 11, there are a plurality of transverse I-beams 27, 28 and 29 whose lower flanges on each side are cut back as at 30 to be brought into abutting engagement with the lower flange of the longitudinal beams 1 and 2 while the remaining ends of these cross beams abut the webs of the main longitudinal beams. It will be noted that these transverse beams are only slightly more than half the height of the longitudinal beams thereby providing what might be termed a depressed space below the upper lever of the longitudinal beams to permit the engine crankcase to extend down between such beams. The transverse beams and longitudinal beams are further connected by diagonal reinforcing plates 31 suitably welded at their lines of juncture, and gusset plates 32 extend from the diagonal plates to the webs of the longitudinal beams. Effective continuations of the transverse beams are created by the provision of a series of cantilever I-beams 33 extending laterally from the upper flanges of the two longitudinal beams. These extensions have their top flanges cut back to permit an abutting connection 34 with the longitudinal I-beam flanges while the remaining ends of these extension beams abut the web of the beams 1 and 2 in the same manner as is the case with the cross beams 27—29. Also lower diagonal members 35 and plates 36 are provided similar to the diagonal member 31 and plate 32. The transverse beams and their extensions are identical structural type I-beams and they are both connected, in substantially the identical manner, to the longitudinal beams except for being turned upside down from each other. The resulting structure is one of great strength for the cantilever extensions 33 and is economical not only by reason of its simplicity of arrangement of the elements and the ease of welding the same at all lines of juncture, but also by the fact that only one type and size of material is needed for the transverse beams 27—29 and their extensions 33. To carry through the feature of a minimum number of structural elements, the diagonal beams members 25, 25' and 26, 26' are of the same type and size as the transverse members and their extensions. The diagonal members, as shown in Fig. 11, have their lower flanges cut to abut the lower flanges of the longitudinal beams as indicated by the line 38, Fig. 11, while the remaining ends of the diagonal beams abut the webs of the longitudinal beams in the same manner as for the transverse members. It will be understood throughout this disclosure that all members are welded to each other along their lines of juncture, and that for purposes of clarity actual welded joints are only diagrammatically indicated at selected junctures for purposes of illustration.

Lateral extensions 40, 40' and 41, 41' are provided for the transverse bolster beams as is particularly shown in Figs. 1, 4 and 7 and which are identical in type and construction and in their relation to the longitudinal I-beams 1 and 2, as are the extensions 33. Diagonal plates 42 and gussets 43 are similarly provided. Similar identical extensions 44, 44' are provided near the front end of the frame and at 45, 45' near the rear end thereof, Fig. 1.

A lower plate 46, Figs. 1, 4 and 10, is welded to the underside of the longitudinal I-beams but only adjacent to the front section. Another plate 47, Fig. 4, is welded across the top of both bolsters to support motor blowers (not shown). As shown in Fig. 9, a series of top and bottom flush type plates 48 and 49 are welded to and between the flanges of the front end longitudinal beams 23 and 24 and to the main beams 1 and 2 adjacent thereto.

Inasmuch as a lightweight frame as generally disclosed herein needs vertical reinforcement, it is customary to use a truss structure therewith, and also to use this truss to provide a supporting frame for the side plates of the locomotive cab. However, truss arrangements heretofore employed in combination with underframes have added considerable weight to the frame. This simply aggravates the very condition which it is desired to minimize, namely, unnecessary weight. I have minimized such weight in my improved underframe by making it a more effective functional part of at least one portion of the truss structure and of causing other elements of the truss structure to perform certain dual functions. My improved construction is shown in Figs. 7 and 8 as applied to one side of the underframe although it will be understood that an identical truss is used on the other side of the frame. The truss includes a lower chord in the form of an angle iron 51 extending between the two bolsters and secured to the top of all of the lateral extensions 40 and 41 of both bolsters and of the intermediate extensions 33. The vertical leg of this angle iron also forms a skirt to cover the ends of the lateral extensions. An upper chord generally indicated at 52 is formed of two angle pieces 53 and 54, as shown in Fig. 8, opposed to each other to form a box structure which is welded together at its outside lines of juncture. This upper chord is effective only for a main portion of the truss. The chords are connected by angle iron type end columns 55 and intermediate H type columns 56 whose webs extend transversely. An angle iron type diagonal 57 is cut so that its lower end is seated as at 58 entirely on chord 51 while its upper end is cut to engage the inner surfaces of both legs of angle iron column 55. An H type diagonal beam 59, with its web disposed transversely, is seated at its lower end entirely on diagonal 57 and is seated at its upper end entirely against the undersurface of flange 60 of the chordal iron 53. Similarly full length diagonals 61 of either angle iron or I-beam types are supported entirely against flange 60 at one end and on chordal member 51 at its lower end as indicated at 62, Fig. 2. Similar full length diagonals extending in different directions to make an effective truss formation are shown at 63, Fig 2.

The front cantilever end of the frame extending beyond the front bolster is supported by a partial height truss generally indicated at 66. Because of the cantilever nature of this front end, the truss members have heretofore been of considerable weight to obtain necessary rigidity but such weight aggravated the problem of attempting to provide a lightweight frame. In my present invention I overcome this difficulty by employing the lateral extensions 40, 41 and 44, Fig. 7, as part of the truss structure itself thereby obtaining a truss of considerable depth with consequent rigidity and minimum weight. To do this I provide a lower chord 67, preferably a channel type member as shown, extending between the lateral beams 40 and 44. This chord is bent slightly inwardly toward its front end starting from a point 68. An upper chord 69, preferably an I-beam type with its web extending transversely, abuts the end column 55 adjacent to the V-juncture of diagonals 57 and 59. An angle iron type end column 70 is supported on top of lateral beam 44 and against chord 69, while a similar angle iron column 71 is supported on chordal member 51 above lateral beam 41. An intermediate angle iron column 72 extends between chordal members 67 and 69. Angle iron type diagonals 73 and 74 are seated entirely against the chordal members. It will be understood that all elements of the truss structure and of the underframe are welded together along their lines of juncture thereby providing an integral whole of the truss and frame.

In order that the truss structure may perform a still further function, it will be noted that the angle member 54 overhangs the leg 60 as shown at 77, and the columns 56 are spaced inwardly from this overhanging portion. A longitudinal spacer element 78 extends for the full length of the upper chord 52 to support side sheet panels 79 of the cab structure. Suitable longitudinal strip packing 80 is inserted above the upper end of the sheet panels to seal the cab against atmospheric elements. The angle iron member 54 serves not only as chordal member but also as a rain deflecting element, as well as providing a convenient slip joint to receive the sheet panels. The end column 55 may be similarly set back if desired and the lower ends of the sheet panels are supported in the usual manner at their lower end adjacent the lower chord 51. The slip joint connection for the panels is only for the main portion of the truss structure and is not used in the cantilever portion.

As shown particularly in Figs. 9 and 10, a front end sill plate 81 is provided while a further plate 82 and longitudinal plates 83 form a coupler pocket 84. Similarly as in Fig. 12 a plate 85 provides both an end sill and coupler box member together with other longitudinal plates 86.

From the foregoing disclosure it is seen that I have provided an improved lightweight welded frame made from a minimum number of types of structural steel shapes so arranged and inter-related as to provide a lightweight frame that has a high degree of rigidity and strength and that is of relatively low cost in construction, operation and maintenance combined with a simplicity which lends itself to efficient welding. The various elements of my improved combined frame and truss bring all of the elements into maximum cooperative relationship so as to provide not only a most desirable integral structure, but also one which provides an extraordinary degree of uninterrupted clear space extending for the full longitudinal length of the frame beneath all lateral beams 44 etc. thereby permitting pipes 88, Fig. 12, or other cable accessories to be easily and effectively installed or removed merely by operation of the hanger bolts 89. This is particularly effective for the pipes passing the bolster laterals 40 and 41 and the front laterals 44.

It will of course be understood that various changes in details of construction and arrangement of parts may be made by those skilled in the art without departing from the spirit of the invention as set forth in the appended claims.

I claim:

1. A locomotive frame comprising, in combination, a pair of longitudinal transversely spaced I-beam sills each of which extends along a single straight line that is continuous from end to end of the frame, said beams being disposed with their webs vertically, transverse I-beams positioned between said sills and placed with their webs vertically and being of less height than the sills, said transverse beams being disposed adjacent to the lower sill flanges and being welded to said flanges and to the sill webs, and other I-beams placed with their webs vertically and extending laterally from the sills as cantilever beams whose outer ends are free, the inner ends of said cantilever beams being disposed adjacent to the upper flanges of the sills and being welded to said upper flanges and to the sill webs.

2. A locomotive frame comprising, in combination, a pair of longitudinal transversely spaced I-beams placed with their webs vertically, transverse I-beams positioned between said sills and placed with their webs vertically and being of less height than the sills, said transverse beams being disposed adjacent to the lower sill flanges and being welded to said sill flanges and to the sill webs, other I-beams placed with their webs vertically and extending laterally from the sills as cantilever beams whose outer ends are free, the inner ends of said cantilever beams being disposed adjacent to the upper flanges of the sills and being welded to said upper sill flanges and to the sill webs, and members extending diagonally upward from the transverse I-beams to the upper flanges of the sills and similar diagonal members extending downwardly from the lateral I-beams to the lower flanges of the sills.

3. A locomotive underframe comprising, in combination, a pair of longitudinal I-beam sills placed with their webs vertically, bolsters disposed near the front and rear ends of the sills, a portion of the sills overhanging the front bolster, beams extending laterally from the sides of said sills adjacent the front bolster and also laterally from said overhanging portion of the sills, a truss along each side of said overhanging portion of the frame having a lower chordal member welded to the lower sides of said lateral beams and an upper chordal member above said lateral beams, said chordal members being joined together by columns and diagonal members whereby the height of the truss is defined by the depth of the lateral beams plus the height of the truss above the same.

4. The combination set forth in claim 3 further characterized by the provision of other beams extending laterally from the sills at points thereof intermediate the bolsters, and a main truss connected to said intermediate lateral beams and having an end column common to said truss for the overhanging frame portion.

5. A locomotive frame comprising a pair of longitudinal I-beam sills and beams extending laterally from said sills, a truss connected to said lateral beams and having an upper chordal member comprising top and bottom opposed angle iron members welded together to form a box structure and columns for said truss secured to the undersurface of said box structure and spaced inwardly from the outer vertical leg of said top angle iron, said vertical leg extending downwardly below the level of said undersurface so as to be in overlapping relation to the column thereby forming a recess into which side panel sheets may be inserted.

6. A locomotive frame comprising, in combination, a pair of longitudinal I-beam sills placed with their webs vertically and spaced apart a distance to define an engine crankcase well, a pair of bolsters located near the ends of the sills each having a pair of transverse I-beams welded to the flanges and webs of said sills, an end sill at one end of the longitudinal sills, a pair of additional longitudinal I-beams interposed between the end sill and bolster and welded to the end sill and bolster, a coupler box supported by said additional longitudinal I-beams by being welded thereto, and means for transmitting coupler forces through said additional I-beams and thence through the bolster and to the longitudinal sills including diagonal I-beams extending from points generally in line with said additional pair of I-beams and thence outwardly to the flanges and webs of the longitudinal sills, said diagonal beams being welded to the bolster and longitudinal sills at their lines of juncture with the flanges and webs of the I-beams of the sills and bolsters.

7. The combination set forth in claim 1 further characterized by the provision of bolster beams disposed between and secured to said longitudinal sills, and additional cantilever beams disposed adjacent to said bolsters and secured to and extending laterally from said sills in the manner of said other cantilever beams whereby all of the cantilever beams constitute the only frame members extending laterally from the sills between the ends of the frame.

8. A locomotive frame comprising, in combination, a pair of longitudinal I-beam sills, a bolster having a pair of I-beams, a center pin structure supported directly upwardly against the lowermost undersurface of the flanges of said bolster beams, and a bottom plate also supported directly against said lowermost undersurfaces and having an opening through which the center pin structure extends, said plate being welded to the flanges of the bolster beams and to the center pin structure whereby horizontal shear forces are transmitted between the center pin and plate directly along a horizontal line below said undermost surfaces passing commonly through the center pin structure and plate.

9. A locomotive frame comprising, in combination, a pair of longitudinal I-beam sills, a bolster having a pair of I-beams, a center pin structure supported directly upwardly against said bolster beams, and a bottom plate having an opening through which the center pin structure extends, said plate extending from the center pin outwardly to beneath a substantial portion of the flanges of the longitudinal sills and being welded to the center pin structure and to the flanges of both the bolster beams and longitudinal sills, whereby horizontal shear forces are transmitted between the center pin and plate directly along a horizontal line passing commonly through the center pin structure and plate and thence to the flanges of the bolster beams and longitudinal sills.

10. A locomotive frame comprising, in combination, a pair of longitudinal I-beam sills, a bolster having a pair of transverse I-beams and a pair of longitudinal I-beams, a pair of I-beams extending rearwardly and diagonally from the longitudinal bolster beams to the longitudinal I-beam sills, a pair of longitudinal I-beams extending from the longitudinal bolster beams forwardly, a center pin structure supported directly upwardly against said bolster beams, and a bottom plate having an opening through which the center pin structure extends, said plate extending laterally, rearwardly, and forwardly from the center pin beneath a substantial portion of the flanges of all of said I-beams and being welded to the center pin structure and to flanges of all of said beams, whereby horizontal shear forces are transmitted between the center pin and plate directly along a horizontal line passing commonly through the center pin structure and plate and thence to the flanges of all of said I-beams.

11. A locomotive frame comprising, in combination, a pair of transversely spaced longitudinally extending I-beam sills placed with their webs vertically, transverse I-beams positioned between said sills and placed with their webs vertically and being of less height than the sills, other I-beams placed with their webs vertically and extending laterally from the sills, the lower flanges of the transverse beams and the upper flanges of the lateral beams being coped so that the webs of the transverse and lateral beams are in abutting contact with the webs of the sills and the lower flanges of the transverse beams and the upper flanges of the lateral beams respectively abutting the lower and upper flanges of the sills, and said transverse and lateral beams being welded to the flanges and to the webs of the sills along lines of juncture therewith.

12. The combination set forth in claim 11 further characterized by the provision of members extending diagonally upward from the transverse I-beams to the upper flanges of the sills and similar members extending diagonally downwardly from the lateral I-beams to the lower flanges of the sills whereby the lateral beams and their diagonal members are substantially inverted from the transverse beams and their diagonal members, said lateral beams being substantially continuations of the transverse beams so that the entire height of the sills is a rigid unit with the transverse and lateral beams.

13. A locomotive frame comprising, in combination, a pair of transversely spaced longitudinally extending I-beam sills placed with their webs vertically, a bolster near one end of said sills having a pair of longitudinally spaced transversely extending I-beams of substantially the same cross sectional shape as said sills, said transverse bolster I-beams having their upper and lower flanges cut back so as to abut the sill flanges and allow the webs of the transverse beams to abut the sill webs, said sills and transverse bolster beams being welded along lines of juncture between their flanges and webs; and a pair of longitudinally extending I-beams, similar in cross sectional size to the transverse bolster beams, coped at their ends so that their flanges and webs abut against the flanges and webs of the bolster beams, all of which are welded together along lines of their juncture.

14. A locomotive frame comprising, in combination, a pair of transversely spaced longitudinal I-beam sills placed with their webs vertically, a bolster near one end of said sills having a pair of longitudinally spaced transversely extending I-beams of substantially the same cross sectional shape as said sills, said transverse bolster I-beams having their upper and lower flanges cut back so as to abut the sill flanges and allow the webs of the transverse beams to abut the sill webs, said sills and transverse bolster beams being welded along lines of juncture between their flanges and webs, and I-beams extending laterally from the upper flanges of the sills adjacent to the bolster beams and being coped so that the inner end of the lateral beams abut against the web and top flange of the sills, all of which are welded together along lines of their juncture.

15. A locomotive frame comprising, in combination, a pair of transversely spaced longitudinally extending I-beam sills placed with their webs vertically, a bolster near one end of said sills having a pair of longitudinally spaced transversely extending I-beams of substantially the same cross sectional shape as said sills, said transverse bolster beams having their upper and lower flanges cut back so as to abut the sill flanges and allow the webs of the transverse beams to abut the sill webs, said sills and transverse bolster beams being welded along lines of juncture between their flanges and webs; and said bolster also having a pair of longitudinally extending I-beams, similar in cross sectional size to the bolster beams, coped at their ends so that their flanges and webs abut against the flanges and webs of the bolster beams, all of which are welded together along their lines of juncture; I-beams extending laterally from a point adjacent to the bolster beams and being coped so that the inner ends of the lateral beams abut against the web and top flanges of the sills all of which are welded together along their lines of juncture, said lateral beams being of less height than the sills whereby the lower flanges of the lateral beams abut the sill webs, and diagonal members extending between the lower flanges of the sills and lateral beams and welded thereto.

16. A locomotive frame comprising, in combination, a pair of transversely spaced longitudinally extending I-beam sills placed with their webs vertically, transversely extending I-beams positioned between said sills and placed with their webs vertically and being of less height than the sills, said transverse beams being coped so that the webs and the lower flanges of the transverse beams are in abutting contact with the webs and the lower flanges of the sills, all of which are welded together along lines of their juncture, and other I-beams placed with their webs vertically and extending laterally from the sills with the top flanges of the sills and one of the flanges of the lateral beams being in engagement with each other and welded together along lines of their juncture.

17. A locomotive frame comprising, in combination, a pair of transversely spaced longitudinally extending I-beam sills, transversely extending I-beams positioned between said sills and placed with their webs vertically and with the lower flanges of the sills and of the transverse beams being in engagement with each other and welded together at lines of their juncture, and other I-beams placed with their webs vertically and extending laterally from the sills with the upper flanges of the sills being in engagement with and welded to one of the flanges of the lateral beams along lines of their juncture.

18. The combination set forth in claim 17 further characterized by the provision of members extending diagonally upward from the transverse I-beams to the level of the upper flanges of the lateral beams, said diagonal members being welded to the upper flanges of the transverse beams and being operatively connected to said upper flanges of said lateral beams.

References Cited in the file of this patent

UNITED STATES PATENTS

| Number | Name | Date |
|---|---|---|
| 1,037,049 | Posson | Aug. 27, 1912 |
| 1,081,942 | Beach | Dec. 23, 1913 |
| 1,821,151 | Gilpin | Sept. 1, 1931 |
| 1,969,844 | Heath | Aug. 14, 1934 |
| 2,103,730 | Lewis et al. | Dec. 28, 1937 |
| 2,203,490 | Dietrichson | June 4, 1940 |
| 2,409,730 | Blomberg et al. | Oct. 22, 1946 |